(12) United States Patent
White (10) Patent No.: US 12,064,042 B1
(45) Date of Patent: Aug. 20, 2024

(54) CONTAINER SYSTEM AND ACCESSORIES

(71) Applicant: Jason White, West Sacramento, CA (US)

(72) Inventor: Jason White, West Sacramento, CA (US)

( * ) Notice: Subject to any disclaimer, the term of this patent is extended or adjusted under 35 U.S.C. 154(b) by 720 days.

(21) Appl. No.: 17/175,385

(22) Filed: Feb. 12, 2021

Related U.S. Application Data (63) Continuation-in-part of application No. 16/986,441, filed on Aug. 6, 2020, now abandoned.

(Continued)

(51) Int. Cl.
*B65D 21/02* (2006.01)
*A47G 19/22* (2006.01)

(Continued)

(52) U.S. Cl.
CPC ..... *A47G 19/2255* (2013.01); *A47G 19/2227* (2013.01); *A47G 19/2288* (2013.01);

(Continued)

(58) Field of Classification Search
CPC ................ A47G 19/2205; A47G 23/02; A47G 23/0241; A47G 23/0266; A47G 19/2255; A47G 19/2288; A47G 2023/0275; A47G 23/0216; A47G 19/2261; A47G 19/22; A47G 19/2272; A47G 21/18; A45C 2200/20; A45F 3/16; A45F 3/18; B65D 1/0246; B65D 1/0261; B65D 21/0233; B65D 21/083; B65D 23/0885; B65D 23/12; B65D 25/24; B65D 41/04; B65D 41/0414; B65D 43/0225; B65D 43/0229; B65D 81/02; B65D 81/025; B65D 81/3876; B65D 81/3879; B65D 81/3886; B65D 81/3888; B65D 81/3881; B65D 2543/00046; B65D 2543/0049; B65D 43/0231; B65D 47/06; B65D 47/286; B65D 81/3872; B65D 81/3883; B65D 2543/00092; B65D 2543/00296; B65D 2543/00407; B65D 2543/00435; B65D 2543/005; B65D 2543/00509; B65D 2543/00537; B65D 2543/00546; B65D 2543/00555; B65D 2543/00851; B65D 2543/00972; B65D 51/249; B65D 2543/00231; B65D 1/16; B65D 2251/0081; B65D 51/18; B65D 51/242; B65D 85/84; B65D 1/0207;

(Continued)

(56) References Cited

U.S. PATENT DOCUMENTS 5,207,345 A 5/1993 Stewart et al.
6,276,547 B1 * 8/2001 Petryna ................ B65D 21/083
220/4.03

(Continued)

*Primary Examiner* — Dionne Pendleton
(74) *Attorney, Agent, or Firm* — Chad Hinrichs PLLC (57) ABSTRACT

An improved reusable containers system having a first threaded means located on the top of the containers and a second threaded means located on the bottom of the container. The container has an opening on top. The bottom of the container can be either open or closed. The various accessories can be attached to the threaded means. The containers can be secured to one another to create various configurations. Further, there are various accessories which can be secured to the threaded means for special applications.

12 Claims, 6 Drawing Sheets

Related U.S. Application Data (60) Provisional application No. 62/883,644, filed on Aug. 7, 2019.

(51) Int. Cl.
  *B65D 43/02* (2006.01)
  *G01G 19/52* (2006.01)
  *G08B 7/00* (2006.01)

(52) U.S. Cl.
  CPC ..... *B65D 21/0228* (2013.01); *B65D 43/0277* (2013.01); *G01G 19/52* (2013.01); *G08B 7/00* (2013.01); *A47G 2019/2238* (2013.01); *A47G 2200/106* (2013.01); *A47G 2200/205* (2013.01); *A47G 2200/226* (2013.01)

(58) Field of Classification Search
  CPC .... B65D 1/023; B65D 19/04; B65D 21/0217; B65D 21/0219; B65D 2203/00; B65D 2203/10; B65D 2231/022; B65D 2251/0003; B65D 2251/0012; B65D 2251/0018; B65D 2251/005; B65D 23/001; B65D 23/104; B65D 23/108; B65D 25/22; B65D 2501/0063; B65D 2519/00034; B65D 2519/00064; B65D 2519/00069; B65D 2519/00099; B65D 2519/00174; B65D 2519/00208; B65D 2519/00268; B65D 2519/00273; B65D 2519/00288; B65D 2519/00293; B65D 2519/00298; B65D 2519/00318; B65D 2519/00323; B65D 2519/00333; B65D 2519/00373; B65D 2519/00422; B65D 2519/00527; B65D 2519/00557; B65D 2519/00572; B65D 2519/00711; B65D 2519/00796; B65D 2519/008; B65D 2543/00222; B65D 2543/00416; B65D 2543/00518; B65D 2543/00564; B65D 2543/00833; B65D 2543/00842; B65D 2543/00898; B65D 39/0005; B65D 39/08; B65D 41/0471; B65D 41/58; B65D 43/02; B65D 47/244; B65D 47/305; B65D 51/1644; B65D 51/1688; B65D 51/243; B65D 55/165; B65D 77/0486; B65D 81/3869; H05K 999/99; A47J 41/00; A47J 41/0038; A47J 41/0044; A47J 41/0061; A47J 41/0083; A47J 41/0094; A47J 41/0022; F25D 2500/02; F25D 3/08; F25D 23/06; F25D 2303/082; F25D 2303/0841; F25D 2303/0842; F25D 2303/0843; F25D 2331/803; F25D 2331/805; F25D 2331/808; F25D 2331/809; F25D 31/006; F25D 31/007; F25D 2303/081; F25D 2303/08223; F25D 2303/0831; F25D 2303/0845; F28D 15/00; Y10T 29/53; Y10S 220/908; Y02W 30/80; G08B 7/068; B67B 7/16; B67B 7/44; A61J 9/00

See application file for complete search history.

(56) References Cited

U.S. PATENT DOCUMENTS

| | | | |
|---|---|---|---|
| 8,025,169 | B2 | 9/2011 | Zimmerman |
| 8,028,850 | B2 | 10/2011 | Zimmerman |
| D759,482 | S | 5/2016 | Haning |
| D778,158 | S | 2/2017 | Haning |
| 9,663,269 | B1 * | 5/2017 | Lasris ............... A47G 19/23 |
| 10,677,516 | B2 | 5/2020 | Huisman |
| 10,945,517 | B1 * | 3/2021 | Gilbar ................ B65D 23/12 |
| 2014/0360908 | A1 * | 12/2014 | Sorensen ............. B65D 51/28 |
| | | | 206/501 |
| 2019/0375548 | A1 * | 12/2019 | Campbell ............ B65D 1/0246 |
| 2020/0407112 | A1 * | 12/2020 | Miksovsky .......... B65D 51/242 |
| 2021/0024273 | A1 * | 1/2021 | Andberg ............ B65D 21/0228 |

* cited by examiner

CONTAINER SYSTEM AND ACCESSORIES

PRIORITY CLAIM

The present application claims priority to, incorporates by reference, and is a Continuation-In-Part of U.S. Provisional patent application Ser. No. 16/986,441 file on Aug. 6, 2020 which claims priority to, incorporates by reference, and is a Continuation-In-Part of U.S. Provisional Patent Application 62/883,644 filed Aug. 7, 2019.

FIELD OF THE INVENTION

The present invention relates generally to jars and other reusable containers. More particularly, the present invention relates to reusable containers and related accessories for special applications.

BACKGROUND OF THE INVENTION

Landfills are a limited resource. They are filling at an ever increasing pace. The marketing and use of single use disposable containers are the single biggest contributor to this quickening pace of filling of the landfills. What is needed, therefore, is a return to reusable containers.

Many of the current single use disposable containers could be replaced with reusable containers. However, the reusable containers currently on the market fail to provide the versatility necessary to warrant replacing the convenience of disposable containers.

What is needed is a reusable container system that provides versatility. A system that has multiple applications and can provide a platform for mobile use and the use of high-tech tools such as tracking.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DESCRIPTION OF THE PREFERRED EMBODIMENTS

The present invention of an improved reusable container system 20 is a series of containers that can be easily linked together to meet various size and use requirements. This varying of sizes along with its various related accessories provides a versatile system.

Figure 1:
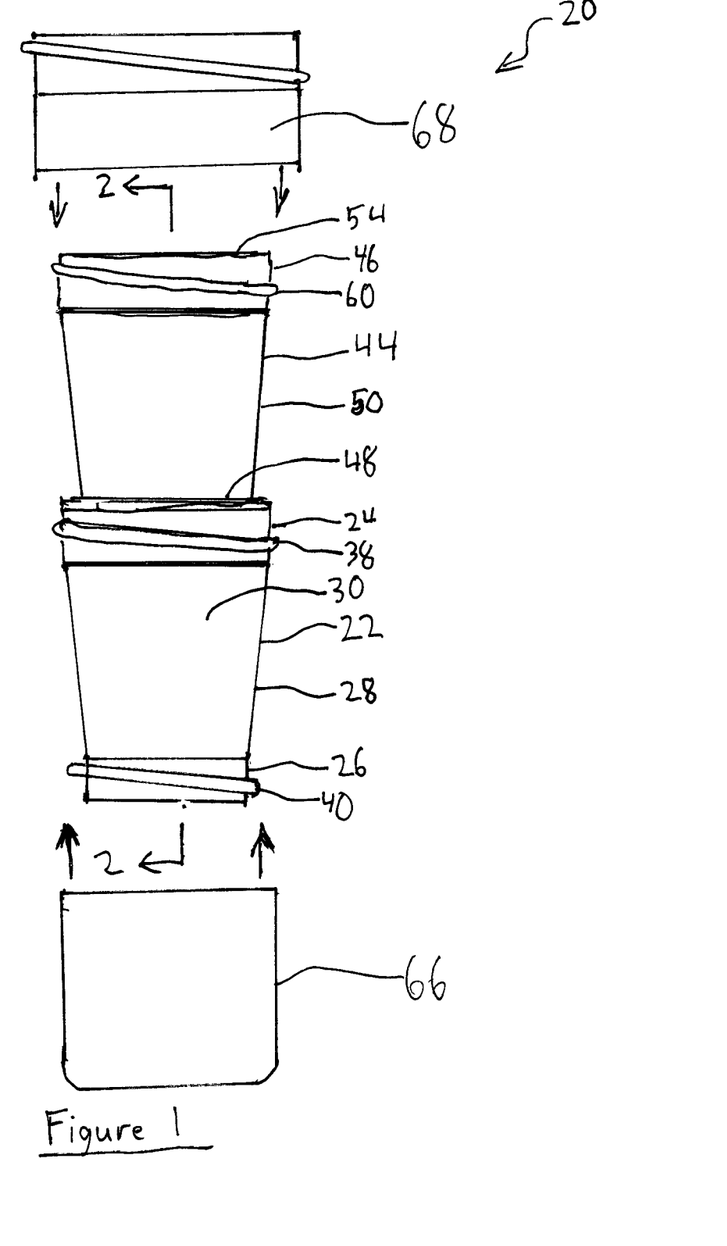
FIG. 1 is a side view of pair of one embodiment of the containers of the present invention coupled together with their boot and lid removed.
Figure 2:
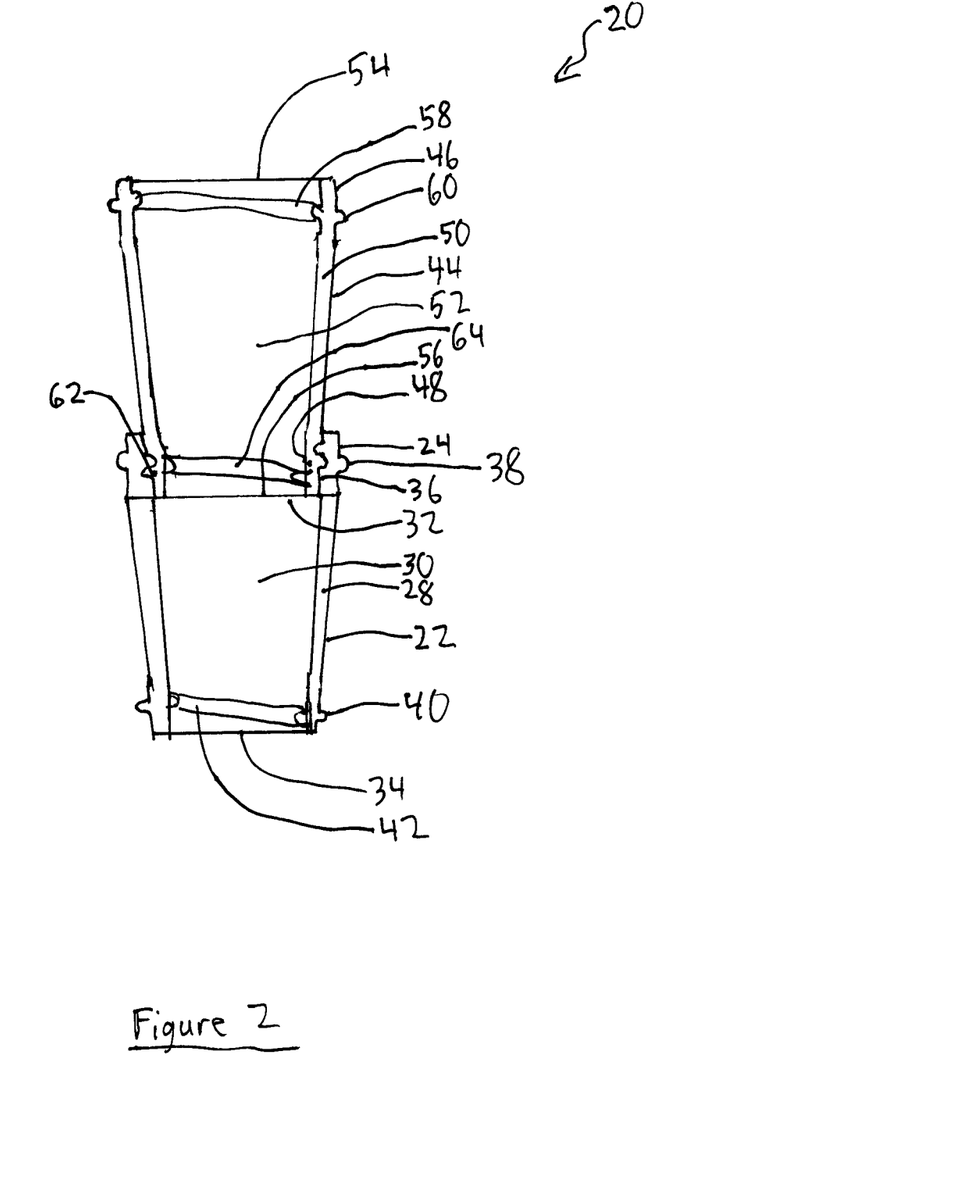
FIG. 2 is a sectional view of the containers shown in FIG. 1.

Turning now to FIGS. 1 and 2, the first embodiment of the present invention of the container system 20 has a first container 22 with a top 24, a bottom 26, a side wall 28, and an interior volume 30. The first container 22 has an opening 32 at the top 24 and an opening 34 at the bottom 26. The top opening 32 has a female thread on the interior surface and a male thread 38 on the exterior surface. The bottom opening 34 has a male thread 40 on the exterior surface. The bottom opening 34 may be equipped with a female thread 42.

The first embodiment of the container system 20 has a second container 44 with a top 46, a bottom 48, a side wall 50, and an interior volume 52. The second container 44 has an opening 54 at the top 46 and an opening 56 at the bottom 48. The top opening 54 has a female thread 58 on the interior surface and a male thread 60 on the exterior surface. The bottom opening 56 has a male thread 62 on the exterior surface. The bottom opening 56 may be equipped with a female thread 64.

The male threads 62 on the bottom opening 56 of the second container 44 are engageable with the female threads 36 on the top opening 32 of the first container 22. When these threads 36 and 62 are engaged the interior volume 30 of the first container 22 is placed in fluid communication with the interior volume 52 of the second container 44

The exact size of the containers 22 and 44 can vary. Likewise, the size of the openings 32, 34, 54, and 56 and the specifications of their respective threads can vary from standard sizes such as tefach, mason jar standard and mason wide mouth to nonstandard and proprietary sizes and thread specifications. It is the inter relationship of these containers 22 and 44 and their openings 32, 34, 54 and 56 and their respective threads that enable the container system 20 of the present invention.

The shape of the containers 22 and 44 can also vary. However, in the preferred embodiment the sidewalls 28 and 50 of the first and second containers 22 and 44 have roughly a V-shaped profile. That is to say, the tops 24 and 46 of these containers have a larger diameter than their bottoms 26 and 48. The sidewalls 28 and 50 have a continuous slant from their larger upper diameter to their smaller bottom diameter. This preferred profile eliminates radii, bulges or other abrupt changes in diameter which can easily be bumped thus leading to damage such as dents, cracks and breakage.

The containers 22 and 44 can be made of any material, including but not limited to glass, metal, plastic and food grade plastic injection mold. In the preferred embodiment, they are glass. Glass is a more ecologically friendly than plastic.

In the preferred embodiment the containers 22 and/or 44 may be equipped with a removeable boot 66. The removeable boot 66 engages with one or more or the threads 40 and 42 on the bottom 26 of the first container 22. The removeable boot 66 may be equipped with various accessories which add versatility to the present invention. Those accessories include but are not limited to the following:

The removeable boot 66 may be equipped with a remotely activated LED light and vibrator. In this embodiment the boot 66 could be used in restaurants to hold a beverage and notify patrons when their table is ready in a manner similar to the lighted vibrating coasters. Thus, when the table is ready the patron's LED light and vibrator are activated by the hostess or other staff to inform them their table is ready.

The removeable boot 66 may be equipped with a heating element. This embodiment can be used to warm a candle or liquid in the container 22.

The removeable boot 66 may be equipped with a connecting means with a male end which is received into punting on the bottom of a container 22. This can be used to provide a positive location for placement of the container 22. It can also help keep the container 22 in place on a moving or vibrating surface.

The removeable boot 66 may be equipped with a stem attached to the bottom of the removeable boot 66, which is then attached to the bottom 26 of the container 22. This can provide a whimsical look for use with wine and other beverages.

The removeable boot 66 may be equipped with a re-freezable packet. This helps cool the contents of the container 22.

A stabilizing base may be located in the removeable boot 66. The stabilizer base provides improved gripping means and a broader stance than the bottom 26 of the container 22.

The removeable boot 66 may be a cup shaped base. This embodiment allows the container 22 to be held in a standard sized cup holder in a vehicle. The bottom of the boot 66 is sized and shaped to be inserted in a cup holder. Once attached the container 22 can be used as a drinking glass in a vehicle.

The removeable boot 66 may seal the bottom 26 of the container 22 and function as a coaster base. Once in place the device functions as a coaster and prevents leaving water marks on the surface it is set upon.

The removeable boot 66 may be equipped with a magnet. Once in place on the container 22 it can be attached to a vertical or horizontal metal surface such as a refrigerator or stove.

The removeable boot 66 may be equipped with a global positioning satellite (GPS) tracking device. Once in place the GPS tracking device can be used locate the container 22 and track its movement.

The removeable boot 66 may be equipped with a scale. The scale can then be used to track the amount of contents in the container 22.

The removeable boot 66 may be equipped with a hook and loop base. In this embodiment the boot 66 has one side of a hook and loop type fastener on the bottom. Once secured to the container 22 the boot 66 can be used to adhere to a surface having the opposite side of the hook and loop fastener.

The removeable boot 66 may be equipped with a suction cup. Once secured to the container 22 the boot 66 can be used to adhere to a flat surface.

The removeable boot 66 may be equipped with a handle.

The removeable boot 66 may seal the bottom 26 of the container 22 and be equipped with a liquid dispensing tap. In this embodiment the boot 66 has a tap which can dispense liquids from the container 22.

The removeable boot 66 may be equipped with a gumball coin vending base. In this embodiment the boot 66 has a mechanism which accepts a coin and then dispenses a gumball or other object from the container 22.

The removeable boot 66 may be equipped with a humidity control base. In this embodiment the boot 66 has a moister dispensing or moister absorbing substance contained in the boot 66 with a porous barrier. The boot 66 can be used to either increase or decrease the humidity in the interior volume 30 of the container 22 depending upon the type of substance used in the base. A cover on the top opening 32 of the container 22 can be equipped with a hygrometer. This will provide the user with information on the humidity level in the container 22. This information can be used to decide whether additional moisture needs to be added or if the moisture absorbing material needs to be changed out. This is useful for storing tobacco, *cannabis* and other products.

The removeable boot 66 may be equipped with a key lock base. In this embodiment it has a lock mechanism which locks to the bottom 26 of a container 22 to provide security to the interior volume 30 of the container 22. This can be useful as a tip jar or coin bank.

The removeable boot 66 may be equipped with a push-up base. In this embodiment the boot 66 has a pedestal which seals against the interior sides of the container 22. A mechanism in the boot 66 can be operated to move the pedestal towards the top 24 of the container 22. This can be used to dispense liquids or pastes from the container 22 as well as maintain a candle at the optimum level in the container 22.

The removeable boot 66 may have a profile which interlocks with a removeable cap 68. The removeable cap 68 engages with one or more threads 36 and 38 located on the top 24 of the container 22. In this embodiment a plurality of containers 22 and 44 can be stacked on top of one another and interlocked with one another. A plurality of stacks of containers 22 and 44 can then be secured to one another with shrink wrap, tape similar packing material. This embodiment eliminates the need for boxes to ship a plurality of containers 22.

The removeable boot 66 may also be equipped with a horseshoe base or a cowbell base.

Figure 3:
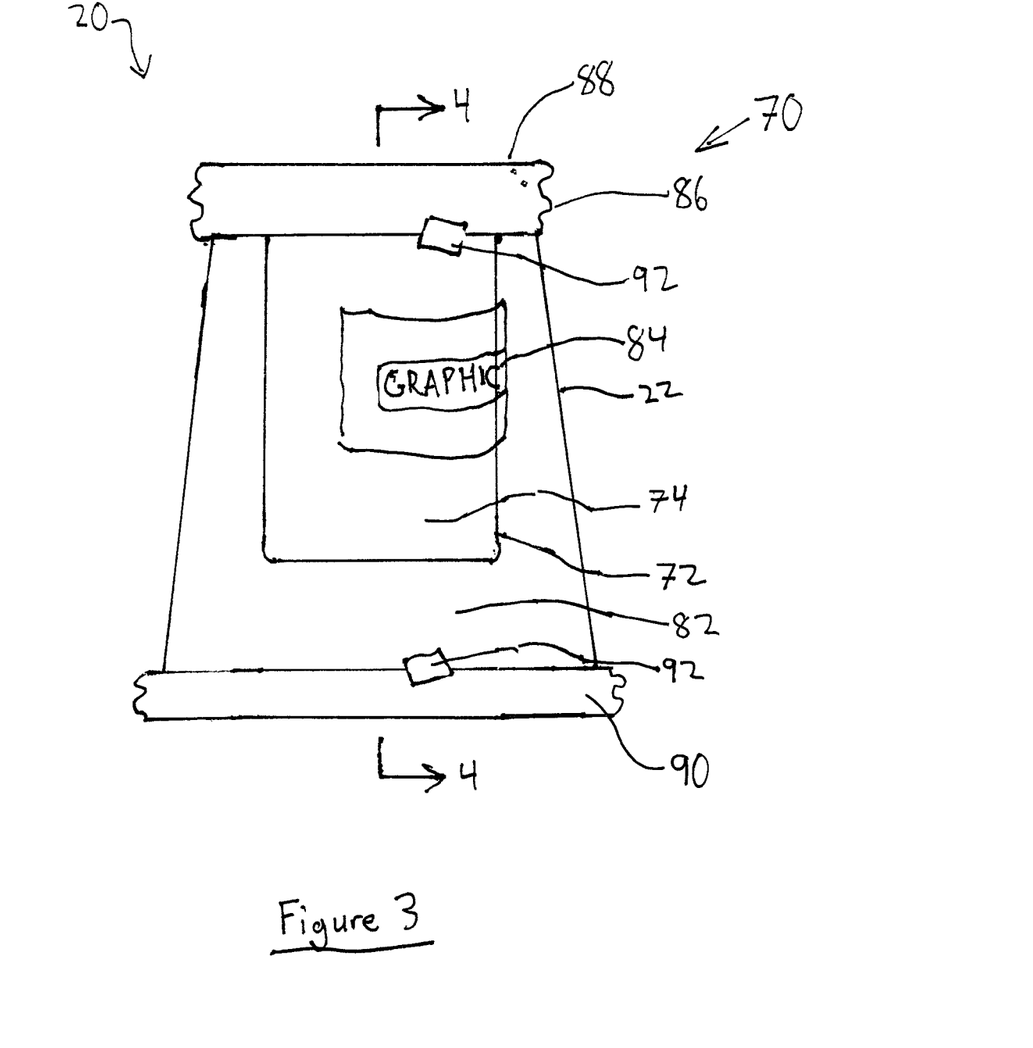
FIG. 3 is a side view of one embodiment of the present invention in an insulated cup format.
Figure 4:
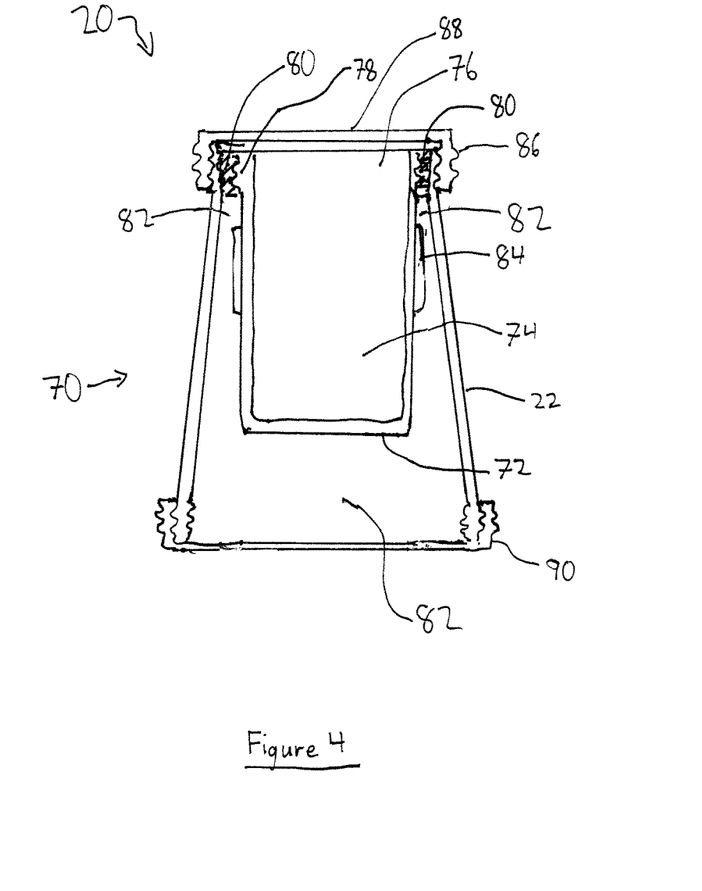
FIG. 4 is sectional view of container shown in FIG. 3.

Turning now to FIGS. 3 and 4 which illustrate the use of the container system 20 as an insulated cup 70. Here an interior container 72 is contained in the interior volume 50 of the first container 22. The interior container 72 has an internal interior volume 74 and a top opening 76 with male threads 78. An adapter 80 engages with the female threads 36 of the first container 22 and the male threads 78 of the interior container 72. This holds the interior container 72 rigidly within the first container 22 and creates a void 82 between the first container 22 and the interior container 72.

The void 82 captures air which provides insulation between the interior volume 74 of the interior container 72 and the environment outside of the insulated cup 70. It also provides a space where graphics 84 can be inserted such that they are visible from outside the insulated cup 70.

Figure 5:
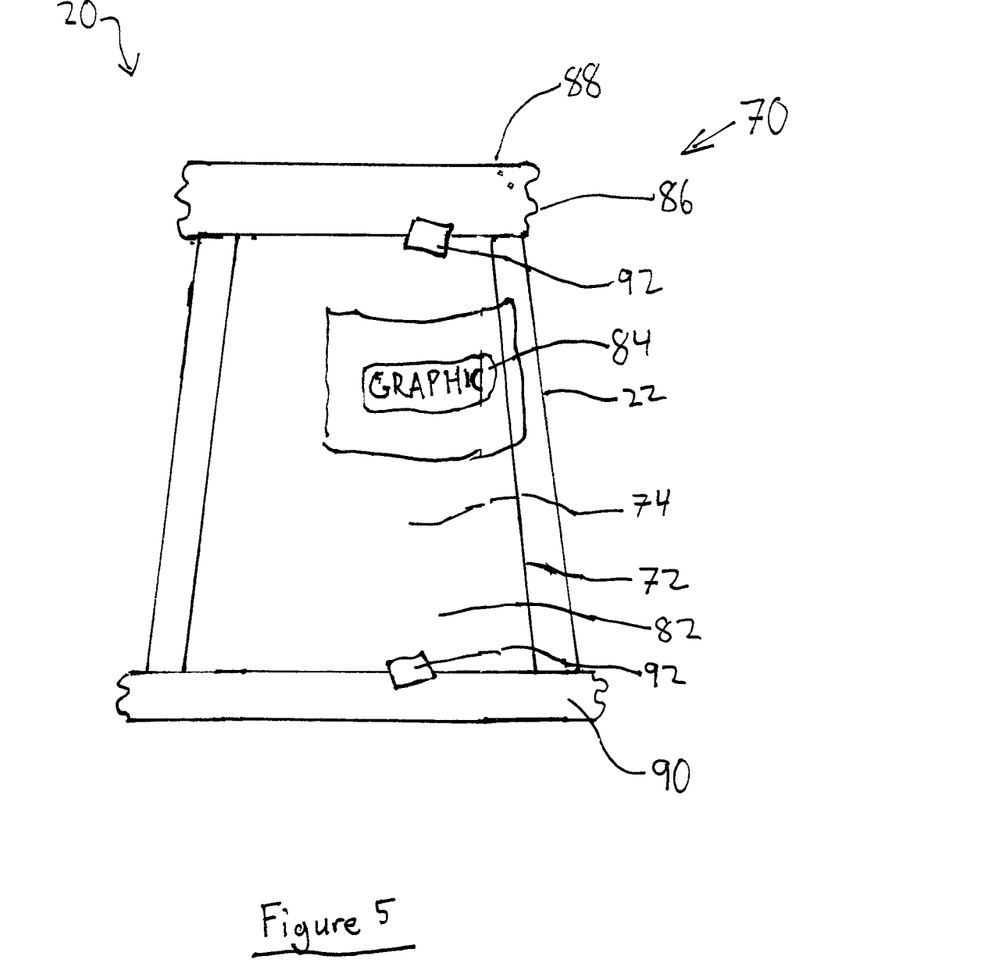
FIG. 5 is a side view of a variation of the embodiment shown in FIG. 3.

The top 86 of the insulated cup 70 can be sealed with a lid 88 which engages with the male threads 38 of the first container 22. The bottom 26 of the first container 22 can similarly be sealed with a lid 90 which engages with one or more of the threads 36 and 38 at the bottom of the first container 22. FIG. 5 illustrates the insulated cup 70 embodiment of the present invention with the interior container 72 replaced with a second container 44 as described above. The seal on the bottom of the interior volume 74 is provided by the lid 90.

In certain circumstances it may be desirable to ensure that the contents of the insulated cap 70 are sealed in and have not been tampered with. This can be accomplished by placing a seal 92 extending from the first container 22 onto the lids 88 and 90. This can be used to meet legal requirements for to-go alcoholic drinks from bars and restaurants. This can also be used to ensure merchandise in a store has not been tampered with since it left the factory.

Figure 6:
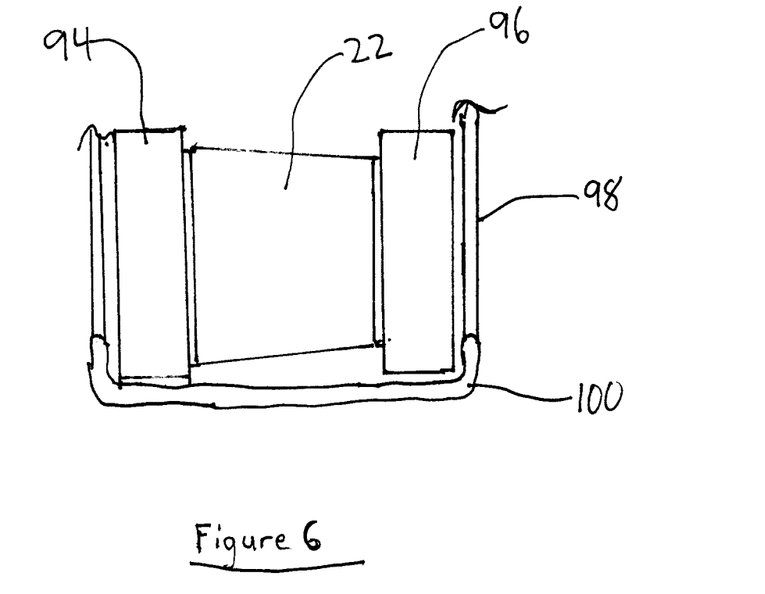
FIG. 6 is a front view of one embodiment of the present invention for use as an insulated cup.
Figure 7:
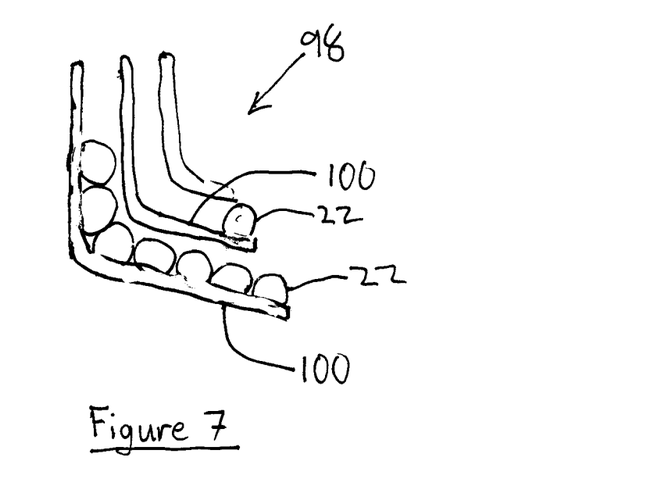
FIG. 7 is a side view of the embodiment shown in FIG. 6.

The container system 20 of the present invention can also be used to display merchandise in a store As seen in FIGS. 6 and 7. Here the first container 22 is equipped with a first lid 94 engaged with the threads 36 or 38 on the top 20 four of the first container 22 and a second lid 96 engaged with the threads 40 or 42 on the bottom 26 of the first container 22. In this embodiment the diameter of the first and second lids 94 and 96 are the same size. A rack 98 with one or more incline planes 100 can be used to display the first container 22 in a horizontal orientation. The incline plane 100 carries the containers 22 on the outer diameters of their respective first and second lids 94 and 96.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A system of reusable containers comprising:
   a first container with a top, a bottom, a side wall and an interior volume;
   an opening on the top, with a female thread on an interior surface of the opening and a male thread on an exterior surface of the opening;
   an opening on the bottom with a male thread on an exterior surface of the opening;
   a second container with a top, a bottom, a side wall and an interior volume;
   an opening on the top, with a female thread on an interior surface of the opening and a male thread on an exterior surface of the opening; and
   an opening on the bottom with a female thread on an interior surface of the opening and a male thread on an exterior surface of the opening.

2. The system of reusable containers of claim 1 further comprising:
   the male threads on the bottom opening of the second container are engageable with the female threads of the top opening on the first container;
   wherein the interior volume of the first container is placed in fluid communication with the interior volume of the second container when the male threads on the bottom of the second container are engaged with the female threads on the top of the first container.

3. The system of reusable containers of claim 2 further comprising:
   the top of the first container having a larger diameter than a smaller diameter of the bottom of the first container; and
   the sidewall of the first container having a continuous slant from the larger diameter to the smaller diameter.

4. The system of reusable containers of claim 3 further comprising:
   a female thread on a surface of the opening on the bottom of the first container.

5. The system of reusable containers of claim 1 further comprising:
   a removable boot engageable with the threads on the opening of the bottom of the first container and capable of sealing the opening of the bottom of the container.

6. The removeable boot of claim 5 further comprising:
   a cylindrical shape sized to fit a standard cup holder.

7. The removeable boot of claim 5 further comprising:
   a magnetic base.

8. A system of reusable containers comprising:
   a first container with a top, a bottom, a side wall and an interior volume;
   an opening on the top, with a female thread on an interior surface of the opening and a male thread on an exterior surface of the opening;
   an opening on the bottom, with a male thread on an exterior surface of the opening;
   a removable boot engageable with the threads on the opening of the bottom of the first container and capable of sealing the opening of the bottom of the container; and
   a lid engageable with the threads on the opening on the top of the first container;
   wherein the lid is shaped to interlock with the removeable boot and secure the first container to a second container.

9. A system of reusable containers comprising:
   a first container with a top, a bottom, a side wall and an interior volume;
   an opening on the top, with a female thread on an interior surface of the opening and a male thread on an exterior surface of the opening;
   an opening on the bottom, with a male thread on an exterior surface of the opening;
   a removable boot engageable with the threads on the opening of the bottom of the first container and capable of sealing the opening of the bottom of the container; and
   a global positioning satellite tracking device.

10. A system of reusable containers comprising:
    a first container with a top, a bottom, a side wall and an interior volume;
    an opening on the top, with a female thread on an interior surface of the opening and a male thread on an exterior surface of the opening;
    an opening on the bottom, with a male thread on an exterior surface of the opening;
    a removable boot engageable with the threads on the opening of the bottom of the first container and capable of sealing the opening of the bottom of the container; and
    a remotely activated LED light and vibrator.

11. A system of reusable containers comprising:
    a first container with a top, a bottom, a side wall and an interior volume;
    an opening on the top, with a female thread on an interior surface of the opening and a male thread on an exterior surface of the opening;
    an opening on the bottom, with a male thread on an exterior surface of the opening;
    a removable boot engageable with the threads on the opening of the bottom of the first container and capable of sealing the opening of the bottom of the container; and
    motion detection device capable of detecting the motion of the boot.

12. A system of reusable containers comprising:
    a first container with a top, a bottom, a side wall and an interior volume;
    an opening on the top, with a female thread on an interior surface of the opening and a male thread on an exterior surface of the opening;
    an opening on the bottom, with a male thread on an exterior surface of the opening;
    a removable boot engageable with the threads on the opening of the bottom of the first container and capable of sealing the opening of the bottom of the container; and
    a scale capable of determining the weight of contents of the container.

* * * * *